Feb. 24, 1942.  H. FRAUENTHAL ET AL  2,274,137
BEARING ASSEMBLY
Filed Sept. 14, 1938
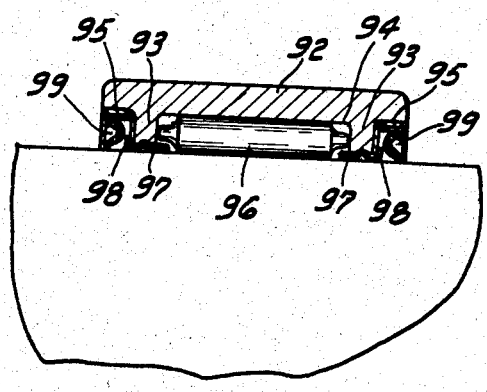
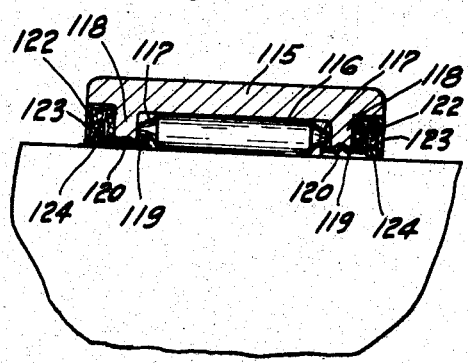
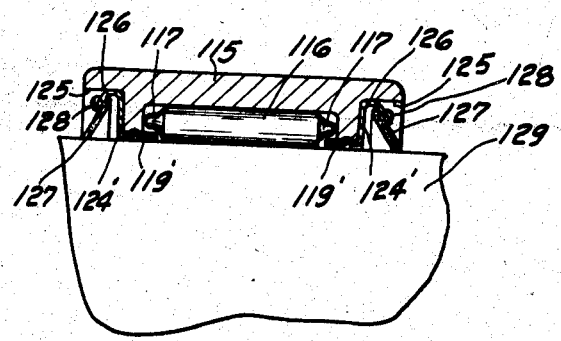
INVENTORS.
HAROLD FRAUENTHAL, STANLEY R. THOMAS,
BY Walter E. Schirmer
ATTORNEY.

Patented Feb. 24, 1942

2,274,137

UNITED STATES PATENT OFFICE 2,274,137

BEARING ASSEMBLY

Harold Frauenthal, South Bend, Ind., and Stanley R. Thomas, Lyons, Mich., assignors to Bantam Bearings Corporation, South Bend, Ind., a corporation of Indiana Application September 14, 1938, Serial No. 229,956

4 Claims. (Cl. 308—187.2)

This invention relates to bearing assemblies, and more particularly is directed to needle bearing assemblies provided with means for retaining the needles in position within the race members, commonly known as self-contained bearings.

The present invention concerns itself mainly with the provision of a bearing race assembly including needle bearings of the trunnion or conical end type which are retained against displacement when the race or shaft is removed from the bearing.

One of the main objects of the present invention is to provide a bearing race having a needle bearing raceway and having radially extending flange portions defining the raceway and provided with retaining means located axially on the flanges and overlying the raceway to an extent such as to overhang the trunnion ends of the bearing members. Preferably, the retaining means comprises a band formed of a soft metal or of hardened spring steel such as clock spring metal, or it may even be a stamped or drawn tube cut to size.

Another feature of the present invention is to provide a retaining band which may be located on the axial face of the flanges by means of prick punches forcing circumferentially spaced portions of the band into a locating or retaining groove in the flange bore. If desired, the band may be preformed with a rib portion which can be located in the groove when the band is sprung into position.

Another feature of the present invention is to provide a band member which has the surface overhanging the trunnion ends of the bearing members of a curvature or shape such as to extend parallel to the corresponding surface on the trunnion. For example, if the trunnion is of the conical type, the inwardly extending surface on the retaining member may have a corresponding conical surface, or if the trunnion is of the rugged type, in which it has a short cylindrical extension joined to the main body of the needle bearing by a heavy fillet and which, in general, approaches closely the conical roller end, then the corresponding surface of the band is similarly formed.

Still another feature of the present invention resides in the provision of a retaining member of this general type which may in turn also serve as a retainer for holding bearing sealing means in the bearing member, or which may serve as the support for a flexible sealing member such as a leather washer, a synthetic rubber seal ring or the like.

Another advantage gained by the present invention is the provision of an assembly in which the retaining means is of simple construction, may be economically formed, and is capable of rapid and simplified attachment to the bearing race without requiring special tools or the like. Further, the retaining member may be readily removed when desired in order to replace bearings if this becomes necessary or desirable.

One of the important features of the present invention is the provision of a retaining member of the split ring type which is located on the bearing lip by striking circumferentially spaced points radially into engagement with a groove formed on the lip. Preferably, the meeting edges of the retaining band are punched in this manner so as, in effect, to provide an increased bearing surface for these edges which counteracts any tendency of the edges to slip past each other, and at the same time slightly expands the band member to provide a positive setting of the same on the lip. Of course, if desirable, the ends of the bands may be joined by welding, soldering or other means.

Other objects and advantages of the present invention will be more apparent from the following detailed description which, taken in conjunction with the accompanying drawing, will disclose to those skilled in the art the particular construction and operation of a preferred form of the present invention.

In the drawing:

Figure 1 is a sectional view of a bearing assembly having retaining means employed also as a retainer for a conventional type of bearing seal;

Figure 2 is a view similar to Figure 1 showing a modification of the retaining member and bearing sealing means; and Figure 3 illustrates a still further modified form of retainer, which in itself forms the support for the sealing member.

In Figure 1 a bearing assembly is disclosed comprising the race member 92 having radially directed shoulders 93 defining the raceway 94, and having axial recesses 95 disposed outwardly of the shoulders 93. Within the raceway 94 is disposed the needle bearing members 96 having trunnion ends adapted to be retained against displacement by retainer members 97 which are locked with respect to the shoulders 93 by means of circumferentially spaced prick punches which lock the members 97 on the annular faces of the flanges 93, it being understood that these faces are provided with radially outwardly opening channels or grooves adapted to receive the metal of the retainer bands displaced by the prick punches. This locks the bands 97 against axial displacement relative to these faces. However, the retainer members 97 are provided with an outwardly directed portion which is flanged radially outwardly as indicated at 98, and which is adapted to form a retaining flange for holding the bearing seal means 99 in position within the recesses 95. The bearing seal means 99 may be of any conventional type such as that employing two oppositely disposed cup members pressed together and retaining therein a leather sealing member or the like. It will thus be apparent that the members 97 which are locked in the grooves 93 by prick punches or, if desired, by an annular rib portion, also serve as a means for retaining the bearing seals 99 in position. This allows the seals to be placed in position without the driving fit usually required against the shoulders 95, and as a result, does not tend to produce the outwardly flaring of the ends of the race member 92, which has customarily been produced heretofore by driving of the bearing seals into position.

In Figure 2 there is disclosed a combined bearing and seal retaining member for the needle roller bearing assembly. In this embodiment of the invention the race member 115 has the needle bearings 116 disposed in the raceway thereof, having the trunnion ends 117 disposed adjacent the radial flanges 118 of the race member. Mounted on each of the flanges 118 is a retainer member 119 having either a continuous annular rib or spaced radial projections 120 for locking the same in the annular grooves formed in the flanges 118. The opposite axial ends of the race member 115 are recessed to receive bearing seal members 122, which may be formed of leather or a similar sealing material, and which are retained by the angle-shaped retaining rings 123 pressed into the axially extending end recesses. The retainer members 119 are each provided with radially outwardly directed end flanges 124 at the outboard sides thereof over which the sealing member 123 is positioned in such manner that the flanges 124 serve to retain the sealing members 122 against outward displacement. As a result, the members 123 do not need as tight a press fit in the recesses as was formerly necessary, and consequently there is less chance of producing distortion of the outer annular surface of the race member 115.

The construction shown in Figure 3 is substantially identical with that shown in Figure 10 with the exception that recesses 125 are provided in the race member 115 which are of a greater diameter. The retainer members 119' in this embodiment of the invention are provided with radial flanges 124' of sufficient extent to project to the outer peripheral surface of the recesses 125 and to be folded back as indicated at 126 with an outwardly diverging end portion to which may be riveted a leather sealing member 127 as by means of the rivet member 128. The sealing members 127 are thereby retained in slightly angled position with respect to the shaft 129 upon which the bearing assembly is mounted, and the retainers 119' serve to retain the bearings 116 in position and also to support the sealing means 127 in proper position at the ends of the race member.

While the illustrated embodiments of the invention herein disclosed provide an indication of certain ways in which the present invention may be carried out in practice, it is not intended that the invention be limited to any of the specific details herein shown and described except as defined by the scope and spirit of the appended claims.

We claim:
1. A bearing assembly comprising a bearing race having radially inwardly directed axially spaced flanges, the ends of said race extending axially outwardly beyond said flanges, needle bearings of the trunnion type in said race between said flanges, annular grooves in the annular faces of said flanges, retaining means for said bearings comprising metallic bands fitting in said flanges and having spaced punched portions located in said grooves, said bands extending axially inwardly to overhang the trunning ends of said bearings and having laterally and radially outwardly extending portions, spaced from the outer radial faces of said flanges, and bearing seal members pressed into the overhanging ends of said race outwardly of said flanges and having portions thereof retained against displacement by engagement of said last-named band portions therewith to compress said portions between the outer radial faces of said flanges and said spaced radially extending portions of said bands.

2. A bearing assembly comprising a bearing race having radially inwardly directed axially spaced flanges, the ends of said race overhanging the outer radial faces of said flanges, needle bearings of the trunnion type in said race between said flanges, annular grooves in the annular faces of said flanges, retaining means for said bearings comprising metallic bands fitting in said flanges and having spaced punched portions located in said grooves, said bands extending axially inwardly to overhang the trunnion ends of said bearings and having radially outwardly extending portions engaging said outer radial faces of said flanges and terminating in reversely turned ends, and flexible bearing seal members secured to said ends and directed radially toward the axis of said assembly.

3. A bearing assembly comprising an outer race member having axially spaced radially inturned flanges defining therebetween a bearing raceway, said member having axially outwardly extending ends overhanging the outer radial faces of said flanges, needle bearing rollers in said raceway for rotatably supporting said member on a shaft or the like, an annular groove formed in the axial face of each flange, a retaining band for each flange overhanging the adjacent ends of said rollers comprising a metallic band-like strip located thereon with the ends thereof in abutment and with the outer edge bent radially outwardly and with the outer radial face of said flange and along the outer reversely bent at an angle to the axis of said race member, said band being retained on said flange by circumferentially spaced prick punches into said groove, the inner edge of said band axially overhanging said roller ends, and a flexible sealing member secured at its outer peripheral edge to said reversely bent edge of said band and extending radially inwardly within the axial overhang of the end of said race member.

4. A bearing assembly comprising an outer race member having axially spaced radially inturned flanges defining therebetween a bearing raceway, said member having axially outwardly extending ends overhanging the outer radial faces of said flanges, needle bearing rollers in said raceway for rotatably supporting said member on a shaft or the like, an annular groove formed in the axial face of each flange, a retaining band for each flange overhanging the adjacent ends of said rollers comprising a metallic band-like strip located thereon with the ends thereof in abutment and with the inner edge overhanging said roller ends, said band having circumferentially spaced prick punch portions into said groove retaining it against axial displacement relative to said flange face, a sealing member disposed in the recess formed by the overhang of said end of said race member and having a portion lying against the outer radial face of said flange, and said band having its outer edge bent radially outwardly for retaining said portion of said sealing member against axial displacement away from said flange face.

HAROLD FRAUENTHAL.
STANLEY R. THOMAS.